United States Patent [19]

Sato et al.

[11] Patent Number: 5,281,340
[45] Date of Patent: Jan. 25, 1994

[54] CATIONIC POLYMER FLOCCULATING AGENTS

[75] Inventors: Shin-ichi Sato; Toshiaki Sakakihara, both of Kitakyushu; Shigeru Sawayama, Yokohama, all of Japan

[73] Assignee: Mitsubishi Kasei Corporation, Tokyo, Japan

[21] Appl. No.: 932,208

[22] Filed: Aug. 19, 1992

[30] Foreign Application Priority Data

Aug. 20, 1991 [JP] Japan .................................. 3-208314

[51] Int. Cl.$^5$ ............................................. C02F 11/14
[52] U.S. Cl. .................................... 210/734; 210/735; 524/922
[58] Field of Search ............... 210/609, 725, 727, 728, 210/734, 735; 524/922

[56] References Cited

U.S. PATENT DOCUMENTS

| | | | |
|---|---|---|---|
| 3,006,756 | 10/1961 | Volker et al. | 75/118 |
| 3,288,707 | 11/1966 | Hurwitz et al. | 210/735 |
| 3,576,740 | 4/1971 | Annand et al. | 210/735 |
| 4,006,247 | 2/1977 | Panzer et al. | 210/735 |
| 4,444,667 | 4/1984 | Burkert et al. | 210/735 |
| 4,943,676 | 7/1990 | Pinschmidt, Jr. et al. | 525/383 |
| 4,957,977 | 9/1990 | Itagaki et al. | 523/328.4 |
| 5,064,909 | 11/1992 | Itagaki et al. | 523/340 |
| 5,185,083 | 2/1993 | Smigo et al. | 210/735 |

FOREIGN PATENT DOCUMENTS 0201192 12/1986 European Pat. Off. .
3715824 11/1987 Fed. Rep. of Germany .
2-238003 9/1990 Japan .

*Primary Examiner*—Peter A. Hruskoci
*Attorney, Agent, or Firm*—David G. Conlin; George W. Neuner

[57] ABSTRACT

Disclosed herein is a flocculating agent comprising a specified cationic polymer having an amidine structure. The cationic polymer flocculating agents according to the present invention have 20 to 90% by mole of a repeating amidine unit represented by the formula (1) and/or (2):

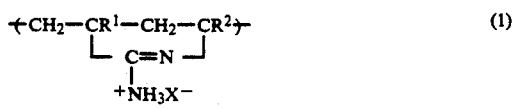

(1)

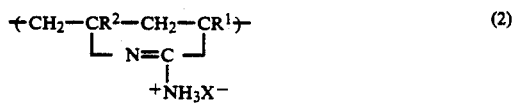

(2)

The agents have a reduced viscosity of 0.1 to 10 dl/g as measured in a 1N saline solution of 0.1 g/dl at 25° C.

The agents have a remarkably excellent performance as flocculating agents, in particular for organic sludge.

38 Claims, No Drawings

CATIONIC POLYMER FLOCCULATING AGENTS

BACKGROUND OF THE INVENTION

1. Field of the Invention

The present invention relates to a flocculating agent. More particularly, it relates to a cationic polymer flocculating agent having an amidine structural unit.

2. Prior Arts

Cationic polymers are used in such applications as flocculating agents, paper-treating agents, and the like. Conventionally known cationic polymers include polymers of metal or ammonium salts of dialkylaminoalkyl(-meth)acrylates, and Hofmann degradation or Mannich reaction products of polyacrylamides. Recently, polyvinylamines obtained by partially modifying homo- or copolymers of N-vinylformamide have been proposed in U.S. Pat. Nos. 4,421,602, 4,774,285 and 4,957,977.

However, the conventional cationic polymers have some disadvantages in certain applications; for example, dehydrating properties, filterability and stability upon storage are still insufficient when used as flocculating agents. Thus, there is a need for further improvement in the performance of cationic polymers.

SUMMARY OF THE INVENTION

The present inventors have made great efforts to overcome the above-mentioned problems of the conventional cationic polymers and found that specified cationic polymers having an amidine structure have a remarkably excellent performance as flocculating agents, in particular for organic sludge. Thus, the present invention has accomplished.

Typically, the cationic polymer flocculating agents according to the present invention have 20 to 90% by mole of a repeating amidine unit represented by the formula (1) and/or (2):

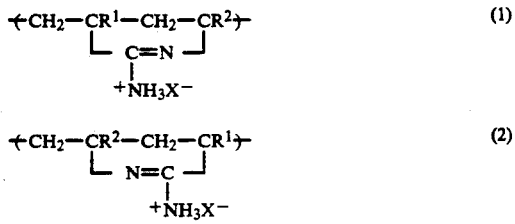

0 to 2% by mole of a repeating substituted amino group unit represented by the formula (3):

0 to 70% by mole of a repeating cyano group unit represented by the formula (4):

and 0 to 70% by mole of a repeating amino group unit represented by the formula (5):

wherein $R^1$ and $R^2$ independently denote a hydrogen atom or a methyl group, $R^3$ denotes an alkyl group having 1 to 4 carbon atoms or a hydrogen atom, and $X^-$ denotes an anion; and have a reduced viscosity of 0.1 to 10 dl/g as measured in a 1N saline solution of 0.1 g/dl at 25° C.

DESCRIPTION OF THE INVENTION

The amidine units represented by the formulae (1) and (2) have an amidine structure of 5-membered ring. Generally, they are equivalently observed in the nuclear magnetic resonance (NMR) and infrared (IR) spectroscopy and quantitatively determined in a total amount of the units (1) and (2). However, with respect to repeating units of a polymer produced in the amidinization reaction as illustrated schematically:

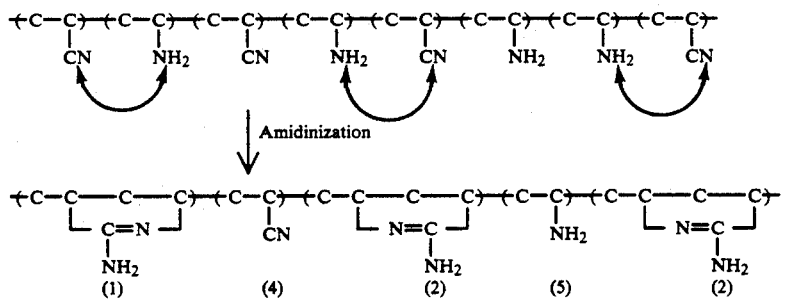

the two kinds of repeating units represented by the formulae (1) and (2) should be taken into consideration. In the above illustration, (4) and (5) represent a cyano group unit and an amino group unit, respectively, which have not been involved in the amidinization reaction.

The methods for preparing the cationic polymers having the amidine structure are not particularly limited. Generally, such polymers may be prepared by forming a copolymer of an ethylenically unsaturated monomer having a primary amino group or a substituted amino group convertible into a primary amino group with a nitrile such as acrylonitrile or methacrylonitrile, and reacting the cyano group with the primary amino group in the copolymer.

The ethylenically unsaturated monomer is preferably represented by the general formula:

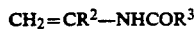

wherein R² denotes a hydrogen atom or a methyl group, R³ denotes an alkyl group having 1 to 4 carbon atoms or a hydrogen atom. In the copolymer, substituted amino groups derived from such ethylenically unsaturated monomers are readily converted into primary amino groups by hydrolysis or alcoholysis. These primary amino groups are in turn reacted with the adjacent cyano groups to amidinize. Examples of the monomers may include N-vinylformamide (R²=H, R³=H) and N-vinylacetamide (R²=H, R³=Me).

The molar ratio of the ethylenically unsaturated monomer to nitrile to be polymerized is generally from 20:80 to 80:20, although other ratio values can be used in the copolymerization, if desired; for example, larger proportions of the ethylenically unsaturated monomer may be used. Generally, the larger the proportion of the amidine units in the cationic polymer flocculating agent, the better the flocculating performance. The amine unit in the polymer may be believed to contribute advantageously to the flocculating performance. Therefore, the molar ratio of the ethylenically unsaturated monomer to nitrile which may provide preferred flocculating agents is usually from 20:80 to 80:20, preferably from 40:60 to 60:40.

The ethylenically unsaturated monomer and nitrile may be copolymerized radically in a conventional manner and any of conventional methods, such as bulk polymerization, solution polymerization causing precipitation in aqueous solution, suspension polymerization and emulsion polymerization, may be employed. The polymerization in a solvent is generally carried out using the starting materials at a concentration of 5 to 80% by weight, preferably 20 to 60% by weight. Any conventional radical initiators may be used in the radical polymerization. Preferably, azo compounds such as 2,2'-azobis-2-amidinopropane hydrochloride are employed. The polymerization is generally effected under inert gas stream at a temperature of 30° to 100° C. The resulting copolymers may be subjected to the subsequent amidinization reaction directly or after diluted, that is, in the form of a solution or suspension. Further, the copolymers may be treated so as to remove solvents therefrom in a known manner and dried to separate them as a solid which is then subjected to the amidinization.

When N-vinylamide compounds represented by the above-described general formula are used as the ethylenically unsaturated monomers, the cationic polymer flocculating agents of the present invention may be prepared by the subsequent amidinization reaction carried out in a two-step process wherein the substituted amino groups in the copolymer are converted into primary amino groups which are then reacted with the adjacent cyano groups to produce an amidine structure. Alternatively, the copolymer may preferably be heated in water or an alcoholic solution in the presence of a strong acid or strong base to produce an amidine structure in a single step. In the latter case, it is also believed that primary amino groups may be produced intermediately.

Illustratively, the latter preferable amidinization reaction may usually be carried out by adding to the copolymer 0.5 to 5.0 equivalents, preferably 1.0 to 3.0 equivalents, based on one equivalent of the substituted amino group in the copolymer, of a strong acid, preferably hydrochloric acid, and heating at a temperature of 80° to 150° C., preferably 90° to 120° C., for 0.5 to 20 hours, to produce a cationized polymer having an amidine unit. Generally, the amidinization may proceed better and more completely with larger equivalent ratio of strong acid relative to substituted amino groups and at higher reaction temperatures. In the amidinization, water will be present in the reaction system in an amount of 10% by weight or more, preferably 20% by weight or more, based on the copolymer to be subjected to the reaction.

Most typically, the flocculating agent comprising the cationic polymer according to the present invention is prepared by copolymerizing N-vinylformamide with acrylonitrile and heating the resulting copolymer, usually in the form of an aqueous suspension, in the presence of hydrochloric acid to form an amidine unit from the substituted amino group and the adjacent cyano group. The flocculating agents comprising the cationic polymers having different compositions may be prepared by selecting the molar ratio of N-vinylformamide to acrylonitrile to be copolymerized and the conditions for amidinization of the copolymers.

Typically, the flocculating agent comprising the cationic polymer according to the present invention contains 20 to 90% by mole of a repeating unit represented by the formula (1) and/or (2), 0 to 2% by mole of a repeating unit represented by the formula (3), 0 to 70% by mole of a repeating unit represented by the formula (4), and 0 to 70% by mole of a repeating unit represented by the formula (5), and has a reduced viscosity of 0.1 to 10 dl/g. The reduced viscosity is herein measured at 25° C. in a 1N saline solution containing the cationic polymer at a concentration of 0.1 g/dl. In the flocculating agents, it may be believed that the amidine unit contributes mainly to the flocculating performance.

Generally, the flocculating performance tends to increase as the proportion of amidine unit in the cationic polymer becomes larger. However, it is difficult to prepare cationic polymers having the amidine unit in a proportion exceeding 90% by mole by the above-described methods such as by heating the copolymer in an aqueous hydrochloric acid solution. Therefore, the proportion of amidine unit in the flocculating agent be preferably in the range of 30 to 85% by mole. Most preferably, the flocculating agents contain the amidine unit in a proportion of 50 to 80% by mole due to easy preparation and better flocculating performance thereof. For instance, one of the most preferable flocculating agents may contain 50 to 80% by mole of the amidine unit and 0 to 2% by mole of the repeating unit represented by the formula (3) wherein the total proportion of the amidine unit and the repeating units represented by the formulae (4) and (5) is 97 to 100% by mole.

The repeating unit (3) is derived from a more expensive N-vinylamide compound relative to acrylonitrile and does not appear to contribute advantageously to the flocculating performance. Generally, the content of repeating unit (3) should be up to 2% by mole, preferably up to 1% by mole. When larger amounts of the repeating unit (3) are present, the dehydrating properties and/or storage stability of the flocculating agent may sometimes deteriorate. However, when the proportion of amidine unit is 50% by mole or more, flocculating agents having good performance may be obtained even if larger amounts of the repeating unit (3) are present. For example, such a flocculating agent may contain 50 to 80% by mole of the amidine unit and 2 to 20% by mole of the repeating unit (3), 0 to 48% by mole of the repeating unit (4) and 0 to 48% by mole of the repeating unit (5) wherein the total proportion of the repeating units (1) to (5) is 90% by mole or more, preferably 97% by mole or more. Such flocculating agents having larger proportions of the repeating unit (3) may be prepared by adding to the copolymer of N-vinylformamide and a nitrile, not more than an equivalent of a strong acid based on the substituted amino groups in the copolymer, and heating the reaction mixture in the presence of water in an amount of not more than 20% by weight based on the copolymer. The resulting cationic polymer flocculating agents are usually poor in stability upon storage; preferably, a strong acid is added to the agents to completely neutralize the cationic units in the repeating units (1), (2) and (5).

The effect of the repeating unit (4) on the flocculating performance has not been understood, but at least it may be believed that there is no adverse effect. The repeating unit (4) is present in the flocculating agent in an amount of 0 to 70% by mole. The nitriles are inexpensive and the presence of the repeating unit (4) will reduce the cost for manufacturing the flocculating agents. Thus, the cost performance is effectively improved. Preferably, the proportion of repeating unit (4) present in the flocculating agent is 5 to 60% by mole, particularly 5 to 50% by mole. In the flocculating agents of the present invention, the molar ratio of amidine unit to repeating unit (4), i.e., (1)+(2)/(4), should generally be in the range of 0.5 to 10.0, preferably in the range of 2.0 to 5.0, since larger proportions of amidine unit usually provide more excellent flocculating performance.

The repeating unit (5) is cationic and may be believed to also contribute to the flocculating performance. The repeating unit (5) is generally present in the flocculating agent in a proportion of 0 to 70% by mole, preferably 5 to 60% by mole. The repeating units (1), (2) and (5) all are derived from the repeating unit (3). Preferably, therefore, as many repeating units (3) as possible are converted into the repeating units (1), (2) or (5). The proportion of the total repeating units (1), (2) and (5) present in the flocculating agent is generally 40% by mole or higher, preferably in the range of 60 to 95% by mole. This means that the repeating units which are believed to advantageously contribute to the flocculating performance comprise a major proportion of the repeating units constituting the flocculating agent. In the flocculating agents of the present invention, the molar ratio of amidine unit to repeating unit (5), i.e., (1)+(2)/(5), is generally in the range of 0.5 to 10.0. Preferably, the molar ratio is in the range of 2.0 to 5.0 since the amidine unit may more effectively contribute to the flocculating performance than the repeating unit (5). As stated previously, the amidine structure is formed by the reaction of the repeating unit (4) with either the adjacent repeating unit (3) or the adjacent repeating unit (5) produced therefrom, leaving some of the repeating units (4) unreacted. Accordingly, one of the preferred flocculating agents according to the present invention may contain the repeating units (1), (2) and (5) in an amount of 70 to 90% by mole in total wherein the total amount of the repeating units (1), (2), (4) and (5) is at least 90% by mole, preferably at least 97% by mole.

In addition to the above-mentioned repeating units, the flocculating agents of the present invention may further contain other repeating units. However, the above-mentioned repeating units should comprise at least 90% by mole, preferably at least 95% by mole in the flocculating agents.

Illustrative examples of the other repeating units which may be contained in the flocculating agents of the present invention include those represented by the following formulae (6) to (9):

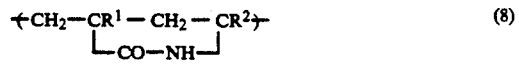

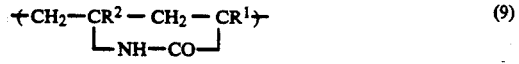

wherein $R^1$ and $R^2$ independently denote a hydrogen atom or a methyl group, and $M^+$ denotes a cation.

The repeating units (6) and (7) are produced by hydrolysis of the repeating unit (4). Thus, in the formation of amidine structure by heating copolymers of a nitrile and N-vinylamide compounds in the presence of a strong acid and water, some of the cyano groups in the copolymer are hydrolyzed to produce the repeating unit (6) of amide group or the repeating unit (7) of carboxyl group. Although the effect of the repeating amide group unit (6) on the flocculating performance is not clear, it is generally believed that smaller proportions of the repeating unit (6) may be preferably employed. Therefore, the proportion of the repeating unit (6) in the flocculating agent according to the present invention is generally up to 5% by mole, preferably up to 2% by mole. The repeating carboxyl group unit (7) is anionic and may be believed to affect adversely the flocculating performance. Therefore, the proportion of the unit (7) is preferably small. The proportion of repeating unit (7) in the flocculating agent is generally up to 5% by mole, preferably up to 2% by mole. Further, it is believed that the repeating lactam units (8) and/or (9) may be produced from the repeating units (5) and (6). The effect thereof on the flocculating performance is not clear but the proportion thereof will generally be up to 5% by mole, preferably up to 2% by mole.

As stated previously, the flocculating agents comprising the cationic polymers according to the present invention have a reduced viscosity in the range of 0.1 to 10 dl/g, preferably in the range of 1 to 8 dl/g.

The flocculating agents according to the present invention may be used to remove suspending materials from various kinds of waste water by flocculating them. In particular, they may be very useful for the treatment of organic sludge. For example, when the flocculating agent of the invention is added to primary settled raw sludge precipitated from sewage, excess sludge precipitated from effluents of active sludge-processing equipments, or mixtures thereof (generally referred to "mixed raw sludge"); or digested sludge formed in anaerobic treatment of active sludge, in sewage-treatment plants, firm and solid flocs are formed. These flocs may be then treated by any squeeze-dehydrating equipment such as belt press, screw press or filter press, or any pressurized dehydrating equipment such as centrifuge or vacuum filter, so that dehydration may be performed at a significantly high speed and filter cakes having low water contents may be produced In addition to the organic sludges generated in city sewage treating plants, sludges generated in treatment of excrements, and sludges generated in anaerobic treatment of excrements or active sludges, as well as sludges generated in treatment of various industrial waste water other than the city sewage may also be advantageously treated by the present flocculating agents.

The flocculating agent of the present invention may be added to a slurry containing sludge in an amount of 0.01 to 3.0% by weight, preferably 0.1 to 1.0% by weight based on the solids contained in the slurry. The pH of the slurry containing sludge is preferably in the range of 3.5 to 8.0. Particularly excellent flocculating effect may be obtained if the agent is added to a slurry having a pH in the range of 4.5 to 7.5.

EXAMPLES

The present invention will be more fully illustrated by the following examples, which do not limit the scope of the present invention as defined in the attached claims In the examples all percentages are by weight unless otherwise stated.

EXAMPLES 1 TO 5

Preparation of Flocculating Agents

Into a 50 four-necked flask equipped with a stirrer, a nitrogen inlet tube and a condenser, 6.0 g of a mixture comprising N-vinylformamide and acrylonitrile in a molar fraction as shown in Table 1, and 34.0 g of desalted water were introduced. The content of the flask was heated to 60° C. under nitrogen gas stream while stirring, after which 0.12 g of a 10% aqueous solution of 2,2'-azobis-2-amidinopropane dihydrochloride was added. After stirring was continued for 4 hours at 45° C., the reaction mixture was heated to 60° C. and held for further 3 hours to produce a suspension of precipitated polymer in water. To the suspension, 20 g of water was added followed by addition of 2 equivalents of concentrated hydrochloric acid based on the formyl groups in the polymer. The reaction mixture was held at 100° C. for 4 hours while stirring to amidinize the polymer. The resulting polymer solution was added to acetone and the precipitated polymer was dried under vacuum. Thus, solid polymers A to E were obtained.

The compositions and reduced viscosity values of these polymers A to E were measured according to the following methods. The results are shown in Table 1.

Compositional Analysis

The compositions starting polymers before amidinization were calculated from integrated values of absorption peaks corresponding to respective monomer units in $^{13}$C NMR spectroscopy.

The compositions of the polymers A to E after amidinization were calculated from integrated values of absorption peaks corresponding to respective repeating units in $^{13}$C NMR spectroscopy. The repeating units (1) and (2) were not distinguished from each other and the sum of both units was calculated; also, the repeating units (8) and (9) were taken together and the sum thereof is given in Table 1.

The absorption peaks of the repeating units (1) and (2), (6), as well as (8) and (9) were observed contiguously in a very narrow region of about 170 to 185 ppm. Therefore, the attribution of each absorption peak to the corresponding structure was determined in the following manner:

Thus, the weight balance was confirmed by elementary analysis and measurement of water content of the polymer concerned. Further, $^{13}$C NMR and IR spectra of the polymer concerned were precisely compared with those of known compounds having an amidine, amide or lactam group.

Measurement of reduced viscosity

Each of the polymers A to dissolved in 1N aqueous solution of sodium chloride to a concentration of 0.1 g/dl, and the reduced viscosity was measured at 25° C. using an Ostwald viscometer.

Flocculating performance test

The flocculating performance of the polymers A to E was tested in the following manner: Into a 200 ml beaker, 100 ml of excess sludge (solid content of 1.5%, pH 6.5) of a commercial active sludge treating plant was put followed by addition of 10 ml of a 0.25% aqueous solution of each polymer A to E. A stirrer having at its end three rods of 5 mm in diameter and 20 mm in length was used to stir the sludge at 1,000 rpm for 10 seconds. The flocculated sludge was filtered through a 60 mesh nylon filter cloth by gravity filtration and the amount of filtrate water filtered for 10 seconds was measured.

The gravity filtered sludge was put between two polyester monofilament filter cloths (Nippon Filcon, OLh-C, 30 cm ×30 cm in size). These filter cloths were then put between polyvinyl chloride plates with draining grooves and dehydrated by a hydraulic press having a piston of 20 mm in diameter at a piston pressure of 50 kg/cm$^2$ for 30 seconds. The weight of the dehydrated sludge and the weight of the solids obtained after drying the dehydrated sludge at 120° C. for 3 hours were measured to calculate the water content of the dehydrated sludge. The amounts of filtrate and the water contents measured are shown in Table 1.

Thermal stability test of flocculating agent

After maintaining the polymers A to E in an oven at 120° C. for hours, 0.4 g of each polymer was added to 200 ml of water and stirred at room temperature for 2 hours. The solution was put onto a plain plate of rubber and the amount of insoluble solids was estimated. The results are shown in Table 1, in which the symbols "circle," "triangle," "x" and "xx" represent "no insoluble solid," "2 to 5 insoluble solid particles," "6 or more insoluble solids," and "almost insoluble," respectively.

COMPARATIVE EXAMPLES 1 AND 2

A polymer F (Comparative Example 1) which was substantially free of repeating unit having an amidine structure and a traditional flocculating polymer G of dimethylaminoethyl acrylate (Comparative Example 2) were prepared and tested for their flocculating performance and thermal stability in the same manner as above. The results are shown in Table 1.

TABLE 1

| | Monomer (mol %) | Amidinization Temper- | Repeating Unit (mol %) |
|---|---|---|---|

TABLE 1-continued

| | Polymer | N-Vinyl-formamide | Acrylo-nitrile | ature (°C.) | Time (Hr) | (1) + (2) Amidine | (3) Formyl | (4) Cyano |
|---|---|---|---|---|---|---|---|---|
| Ex. 1 | A | 70 | 30 | 100 | 4 | 32 | 2 | 8 |
| Ex. 2 | B | 60 | 40 | 100 | 4 | 39 | 1 | 17 |
| Ex. 3 | C | 50 | 50 | 100 | 4 | 54 | 0 | 23 |
| Ex. 4 | D | 40 | 60 | 100 | 4 | 56 | 0 | 35 |
| Ex. 5 | E | 30 | 70 | 100 | 4 | 32 | 0 | 55 |
| Comp. Ex. 1 | F | 50 | 50 | 60 | 10 | 3 | 6 | 48 |
| Comp. Ex. 2 | G | — | — | — | — | — | — | — |

| | Repeating Unit (mol %) | | | | Reduced Viscosity (dl/g) | Filtrate (ml) | Water Content (%) | Thermal Stability |
|---|---|---|---|---|---|---|---|---|
| | (5) Amino | (6) Amide | (7) Carboxyl | (8) + (9) Lactam | | | | |
| Ex. 1 | 58 | 0 | 0 | 0 | 5.0 | 120 | 73 | ○ |
| Ex. 2 | 43 | 0 | 0 | 0 | 4.5 | 110 | 74 | ○ |
| Ex. 3 | 23 | 0 | 0 | 0 | 4.0 | 115 | 73 | ○ |
| Ex. 4 | 6 | 2 | 1 | 0 | 3.5 | 100 | 75 | ○ |
| Ex. 5 | 8 | 3 | 2 | 0 | 3.0 | 100 | 75 | △ |
| Comp. Ex. 1 | 43 | 0 | 0 | 0 | 4.0 | 80 | 77 | XX |
| Comp. Ex. 2 | — | — | — | — | 7.0 | 70 | 78 | X |

COMPARATIVE EXAMPLES 3 TO 6 AND EXAMPLES 6 TO 10

The procedures of Example 3 were repeated except that the amidinization of copolymers of acrylonitrile and N-vinylformamide was effected while varying the amount of hydrochloric acid, reaction temperature and reaction time. The polymers H to O shown in Table 2 were obtained. In Comparative Example 6, the amount of concentrated hydrochloric acid added was one equivalent based on the formyl groups in the copolymer.

These polymers were tested for their flocculating performance as in Example 1 to determine the amount of filtrate and the water content of each polymer. The results are shown in Table 2.

TABLE 2

| | Polymer | Monomer (mol %) | | Amidinization | | Repeating Unit (mol %) | | |
|---|---|---|---|---|---|---|---|---|
| | | N-Vinyl-formamide | Acrylo-nitrile | Temperature (°C.) | Time (Hr) | (1) + (2) Amidine | (3) Formyl | (4) Cyano |
| Comp. Ex. 3 | H | 50 | 50 | 75 | 2 | 3 | 10 | 49 |
| Comp. Ex. 4 | I | 50 | 50 | 75 | 4 | 5 | 5 | 47 |
| Comp. Ex. 5 | J | 50 | 50 | 75 | 10 | 11 | 0 | 44 |
| Comp. Ex. 6 | K | 50 | 50 | 75 | 10 | 12 | 9 | 44 |
| Ex. 6 | L | 50 | 50 | 95 | 2 | 20 | 0 | 42 |
| Ex. 7 | M | 50 | 50 | 95 | 4 | 33 | 0 | 33 |
| Ex. 8 | N | 50 | 50 | 95 | 8 | 43 | 0 | 28 |
| Ex. 9 | O | 50 | 50 | 110 | 2 | 54 | 0 | 20 |
| Ex. 10 | P | 50 | 50 | 110 | 4 | 62 | 0 | 13 |

| | Repeating Unit (mol %) | | | | Reduced Viscosity (dl/g) | Filtrate (ml) | Water Content (%) |
|---|---|---|---|---|---|---|---|
| | (5) Amino | (6) Amide | (7) Carboxyl | (8) + (9) Lactam | | | |
| Comp. Ex. 3 | 38 | 0 | 0 | 0 | 3.3 | 50 | 79 |
| Comp. Ex. 4 | 42 | 0 | 0 | 0 | 3.5 | 80 | 78 |
| Comp. Ex. 5 | 45 | 0 | 0 | 0 | 4.0 | 95 | 77 |
| Comp. Ex. 6 | 35 | 0 | 0 | 0 | 4.0 | 90 | 78 |
| Ex. 6 | 38 | 0 | 0 | 0 | 4.0 | 100 | 75 |
| Ex. 7 | 34 | 0 | 0 | 0 | 4.0 | 110 | 73 |
| Ex. 8 | 29 | 0 | 0 | 0 | 4.0 | 115 | 73 |
| Ex. 9 | 23 | 2 | 1 | 0 | 4.0 | 110 | 73 |
| Ex. 10 | 19 | 3 | 2 | 1 | 3.8 | 105 | 73 |

EXAMPLES 11 TO 13

Into a 50 ml four-necked flask equipped with a stirrer, an nitrogen inlet and a condenser, 6.0 g of a mixture comprising N-vinylformamide and acrylonitrile in a molar fraction as shown in Table 3 and 34.0 g of desalted water. The contents of the flask were heated to 45° C. under stirring in a nitrogen gas stream, and 0.12 g of a 10% aqueous solution of 2,2'-azobis-amidinopropane dihydrochloride was added. After stirring at 45° C. for 4 hours, the reaction mixture was heated to 60° C. and held at this temperature for 3 hours to obtain a suspension comprising precipitated polymers in water.

The precipitated polymer was filtered out and dried under vacuum to obtain solid matter having a water content of 15%. The solids were put into a 50 ml rotating egg-plant type flask and an equivalent amount of concentrated hydrochloric acid based on the formyl groups in the polymer was added. The mixture was maintained at 100° C for 5 hours to amidinize the polymer. The resulting polymer was added into acetone, washed, and dried under vacuum to obtain solid polymers Q to S as shown in Table 3.

These polymers Q to S were tested for their flocculating performance as in Example 1 to determine the amount of filtrate and the water content. The results are shown in Table 3.

EXAMPLES 14 TO 18 AND COMPARATIVE EXAMPLES 7 AND 8

The procedures for testing flocculating performance of Example 1 were repeated to determine the amount of filtrate and the water content, except that each of the above-mentioned polymers A to G in an amount as shown in Table 4 was added to three different organic sludges. The results are shown in Table 4.

TABLE 4

| | | Sludge X (Mixed Raw Sludge 2.6% solid, pH 4.5) | | | | Sludge Y (Mixed Raw Sludge 1.7% solid, pH 7.0) | |
|---|---|---|---|---|---|---|---|
| Amount of Polymer Added (wt % based on solids) | | 0.3 | | 0.5 | | 0.4 | |
| | Polymer | Filtrate (ml) | Water Content (%) | Filtrate (ml) | Water Content (%) | Filtrate (ml) | Water Content (%) |
| Ex. 14 | A | 90 | 72 | 120 | 70 | 95 | 75 |
| Ex. 15 | B | 85 | 72 | 110 | 70 | 90 | 75 |
| Ex. 16 | C | 90 | 72 | 110 | 70 | 90 | 75 |
| Ex. 17 | D | 80 | 72 | 100 | 71 | 90 | 76 |
| Ex. 18 | E | 80 | 73 | 100 | 71 | 80 | 77 |
| Comp. Ex. 7 | F | 60 | 74 | 70 | 74 | 65 | 79 |
| Comp. Ex. 8 | G | 50 | 75 | 60 | 75 | 60 | 80 |

| | | Sludge Y (Mixed Raw Sludge 1.7% solid, pH 7.0) | | Sludge Z (Digested Raw Sludge 2.1% solid, pH 7.4) | | | |
|---|---|---|---|---|---|---|---|
| Amount of Polymer Added (wt % based on solids) | | 0.6 | | 0.6 | | 0.9 | |
| | Polymer | Filtrate (ml) | Water Content (%) | Filtrate (ml) | Water Content (%) | Filtrate (ml) | Water Content (%) |
| Ex. 14 | A | 120 | 74 | 55 | 83 | 70 | 82 |
| Ex. 15 | B | 110 | 74 | 60 | 83 | 70 | 82 |
| Ex. 16 | C | 110 | 74 | 55 | 83 | 70 | 82 |
| Ex. 17 | D | 95 | 75 | 55 | 83 | 70 | 82 |
| Ex. 18 | E | 90 | 76 | 50 | 84 | 60 | 83 |
| Comp. Ex. 7 | F | 75 | 78 | 45 | 85 | 50 | 84 |
| Comp. Ex. 8 | G | 70 | 79 | 40 | 85 | 50 | 84 |

The organic sludges treated with the cationic polymer flocculating agent according to the present invention form firm and solid flocs which may be very efficiently treated subsequently. Specifically, filtration may be performed at a high speed and cakes with low water contents may be obtained after dehydration.

In particular, the flocculating agents of the present invention may be very effective for the treatment of excess sludges, mixed raw sludges and digested sludges generated abundantly in city sewage treating plants.

TABLE 3

| | Polymer | Monomer (mol %) | | Amidinization | | Repeating Unit (mol %) | | |
|---|---|---|---|---|---|---|---|---|
| | | N-Vinyl-formamide | Acrylo-nitrile | Temperature (°C.) | Time (Hr) | (1) + (2) Amidine | (3) Formyl | (4) Cyano |
| Ex. 11 | Q | 50 | 50 | 100 | 5 | 54 | 12 | 23 |
| Ex. 12 | R | 45 | 55 | 100 | 5 | 63 | 8 | 26 |
| Ex. 13 | S | 55 | 45 | 100 | 5 | 56 | 16 | 14 |

| | Repeating Unit (mol %) | | | | Reduced Viscosity (dl/g) | Filtrate (ml) | Water Content (%) |
|---|---|---|---|---|---|---|---|
| | (5) Amino | (6) Amide | (7) Carboxyl | (8) + (9) Lactam | | | |
| Ex. 11 | 11 | 0 | 0 | 0 | 4.5 | 120 | 73 |
| Ex. 12 | 2 | 0 | 0 | 0 | 4.0 | 110 | 74 |
| Ex. 13 | 14 | 0 | 0 | 0 | 4.8 | 125 | 73 |

What is claimed is:

1. A process for flocculating organic sludge, the process comprising adding to the organic sludge an effective amount of a cationic polymer flocculating agent which contains 20 to 90% by mole of a repeating unit represented by the formula (1) and/or (2):

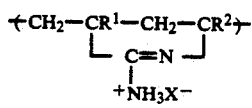 (1)

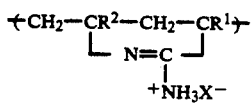 (2)

0 to 2% by mole of a repeating unit represented by the formula (3):

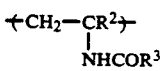 (3)

0 to 70% by mole of a repeating unit represented by the formula (4):

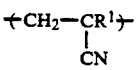 (4)

and 0 to 70% by mole of a repeating unit represented by the formula (5):

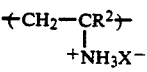 (5)

wherein $R^1$ and $R^2$ independently denote a hydrogen atom or a methyl group, $R^3$ denotes an alkyl group having 1 to 4 carbon atoms or a hydrogen atom, and $X^-$ denotes an anion; and which has a reduced viscosity of 0.1 to 10 dl/g as measured in a 1N saline solution of 0.1 g/dl at 25° C.

2. The process for flocculating organic sludge of claim 1, wherein the cationic polymer flocculating agent contains 30 to 85% by mole of the repeating unit represented by the formula (1) and/or (2).

3. The process for flocculating organic sludge of claim 2, wherein the cationic polymer flocculating agent contains 50 to 80% by mole of the repeating unit represented by the formula (1) and/or (2).

4. The process for flocculating organic sludge of claim 1, wherein the cationic polymer flocculating agent contains 5 to 60% by mole of the repeating unit represented by the formula (4) and 5 to 60% by mole of the repeating unit represented by the formula (5).

5. The process for flocculating organic sludge of claim 4, wherein the cationic polymer flocculating agent contains 5 to 50% by mole of the repeating unit represented by the formula (4) and 5 to 50% by mole of the repeating unit represented by the formula (5).

6. The process for flocculating organic sludge of claim 1, wherein in the cationic polymer flocculating agent, the total proportion of the repeating unit represented by the formula (1) and/or (2) and the repeating unit represented by the formula (5) is at least 40% by mole.

7. The process for flocculating organic sludge of claim 6, wherein the total proportion of the repeating unit represented by the formula (1) and/or (2) and the repeating unit represented by the formula (5) is 60 to 90% by mole.

8. The process for flocculating organic sludge of claim 1, wherein in the cationic polymer flocculating agent, the total proportion of the repeating unit represented by the formula (1) and/or (2), the repeating unit represented by the formula (4) and the repeating unit represented by the formula (5) is at least 90% by mole.

9. The process for flocculating organic sludge of claim 8, wherein the total proportion of the repeating unit represented by the formula (1) and/or (2), the repeating unit represented by the formula (4) and the repeating unit represented by the formula (5) is 97 to 100% by mole.

10. The process for flocculating organic sludge of claim 1, wherein in the cationic polymer flocculating agent, the ratio of the repeating unit represented by the formula (1) and/or (2) to the repeating unit represented by the formula (4) is 0.5 to 10.

11. The process for flocculating organic sludge of claim 10, wherein the ratio of the repeating unit represented by the formula (1) and/or (2) to the repeating unit represented by the formula (4) is 2 to 5.

12. The process for flocculating organic sludge of claim 1, wherein in the cationic polymer flocculating agent, the ratio of the repeating unit represented by the formula (1) and/or (2) to the repeating unit represented by the formula (5), is 0.5 to 10.

13. The process for flocculating organic sludge of claim 12, wherein the ratio of the repeating unit represented by the formula (1) and/or (2) to the repeating unit represented by the formula (5) is 2 to 5.

14. The process for flocculating organic sludge of claim 1, wherein the cationic polymer flocculating agent further contains 0 to 2% by mole of a repeating unit represented by the formula (6):

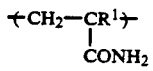 (6)

0 to 2% by mole of a repeating unit represented by the formula (7):

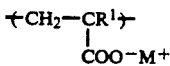 (7)

and 0 to 2% by mole of a repeating unit represented by the formula (8) and/or (9)

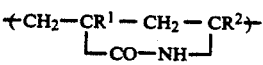 (8)

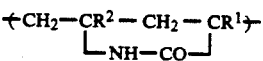 (9)

wherein $R^1$ and $R^2$ independently denote a hydrogen atom or a methyl group, and $M^+$ denotes a cation.

15. The process for flocculating organic sludge of claim 1, wherein the cationic polymer flocculating agent contains 0 to 1% by mole of the repeating unit represented by the formula (3).

16. The process for flocculating organic sludge of claim 1, wherein R³ in the formula (3) denotes a hydrogen atom.

17. The process for flocculating organic sludge or claim 1, wherein 0.01 to 3.0% by weight, based on the solid content of the organic sludge, of the cationic polymer flocculating agent is added.

18. The process for flocculating organic sludge of claim 17, wherein 0.1 to 1.0% by weight, based on the solid content of the organic sludge, of the cationic polymer flocculating agent is added.

19. The process for flocculating organic sludge of claim 1, wherein the organic sludge is mixed raw sludge.

20. The process for flocculating organic sludge of claim 1, wherein the organic sludge is digested sludge.

21. The process for flocculating organic sludge of claim 1, wherein the organic sludge has a pH of 3.5 to 8.0.

22. The process for flocculating organic sludge of claim 21, wherein the organic sludge has a pH of 4.5 to 7.5.

23. The process for flocculating organic sludge of claim 1, the process further comprising dehydrating the flocculated organic sludge.

24. A process for flocculating organic sludge, the process comprising adding to the organic sludge an effective amount of a cationic polymer flocculating agent which contains 50 to 90% by mole of a repeating unit represented by the formula (1) and/or (2):

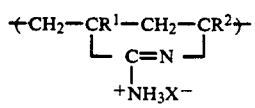 (1)

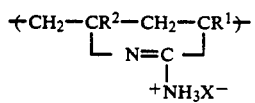 (2)

wherein R¹ and R² independently denote a hydrogen atom or a methyl group, and X⁻ denotes an anion; and which has a reduced viscosity of 0.1 to 10 dl/g as measured in a 1N saline solution of 0.1 g/dl at 25° C.

25. The process for flocculating organic sludge of claim 24 wherein the cationic polymer flocculating agent further contains 2 to 20% by mole of a repeating unit represented by the formula (3):

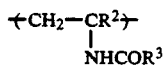 (3)

0 to 48% by mole of a repeating unit represented by the formula (4):

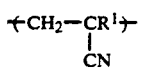 (4)

and 0 to 48% by mole of a repeating unit represented by the formula (5):

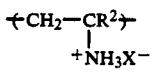 (5)

wherein R¹ and R² independently denote a hydrogen atom or a methyl group, R³ denotes an alkyl group having 1 to 4 carbon atoms or a hydrogen atom, and X⁻ denotes an anion.

26. The process for flocculating organic sludge of claim 24, wherein in the cationic polymer flocculating agent, the total proportion of the repeating unit represented by the formula (1) and/or (2), the repeating unit represented by the formulae (3), the repeating unit represented by the formula (4) and the repeating unit represented by the formula (5) is 97 to 100% by mole.

27. The process for flocculating organic sludge of claim 24, wherein R³ in the formula (3) denotes a hydrogen atom.

28. The process for flocculating organic sludge of claim 24, wherein 0.01 to 3.0% by weight, based on the solid content of the sludge, of the cationic polymer flocculating agent is added.

29. The process for flocculating organic sludge of claim 28, wherein 0.1 to 1.0% by weight, based on the solid content of the organic sludge, of the cationic polymer flocculating agent is added.

30. The process for flocculating organic sludge of claim 24, wherein the organic sludge i mixed raw sludge.

31. The process for flocculating organic sludge of claim 24, wherein the organic sludge is digested sludge.

32. The process for flocculating organic sludge of claim 24, wherein the organic sludge has a pH of 3.5 to 8.0.

33. The process for flocculating organic sludge of claim 32, wherein the organic sludge has a pH of 5.5 to 7.0.

34. The process for flocculating organic sludge of claim 24, the process further comprising dehydrating the flocculated organic sludge.

35. The process for flocculating organic sludge, the process comprising adding to the organic sludge an effective amount of a cationic polymer flocculating agent which contains 50 to 80% by mole of a repeating unit represented by the formula (1) and/or (2):

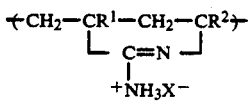 (1)

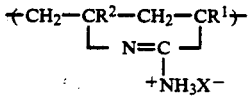 (2)

0 to 2% by mole of a repeating unit represented by the formula (3):

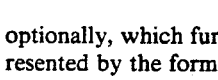 (3)

optionally, which further contains a repeating unit represented by the formula (4):

$$\text{+CH}_2\text{—CR}^1\text{+} \quad (4)$$
$$\quad\quad | $$
$$\quad\quad \text{CN}$$

and/or a repeating unit represented by the formula (5):

$$\text{+CH}_2\text{—CR}^2\text{+} \quad (5)$$
$$\quad\quad | $$
$$\quad\quad ^+\text{NH}_3\text{X}^-$$

the total proportion of the repeating unit represented by the formula (1) and/or (2), the repeating unit represented by the formula (4) and the repeating unit represented by the formula (5) being 97 to 100% by mole, wherein $R^1$ and $R^2$ independently denote a hydrogen atom or a methyl group, $R^3$ denotes an alkyl group having 1 to 4 carbon atoms or a hydrogen atom, and $X^-$ denotes an anion; and which has a reduced viscosity of 0.1 to 10 dl/g as measured in a 1N saline solution of 0.1 g/dl at 25° C.

36. The process for flocculating organic sludge of claim 35, the process further comprising dehydrating the flocculated organic sludge.

37. The process for flocculating organic sludge, the process comprising adding to the organic sludge an effective amount of a cationic polymer flocculating agent which contains 50 to 80% by mole of a repeating unit represented by the formula (1) and/or (2):

$$\text{+CH}_2\text{—CR}^1\text{—CH}_2\text{—CR}^2\text{+} \quad (1)$$
$$\quad\quad\quad\quad\lfloor\quad \text{C=N}\quad\rfloor$$
$$\quad\quad\quad\quad\quad\quad | $$
$$\quad\quad\quad\quad\quad ^+\text{NH}_3\text{X}^-$$

-continued
$$\text{+CH}_2\text{—CR}^2\text{—CH}_2\text{—CR}^1\text{+} \quad (2)$$
$$\quad\quad\quad\quad\lfloor\quad \text{N=C}\quad\rfloor$$
$$\quad\quad\quad\quad\quad\quad | $$
$$\quad\quad\quad\quad\quad ^+\text{NH}_3\text{X}^-$$

and 2 to 20% by mole of a repeating unit represented by the formula (3):

$$\text{+CH}_2\text{—CR}^2\text{+} \quad (3)$$
$$\quad\quad | $$
$$\quad\quad \text{NHCOR}^3$$

optionally, which further contains a repeating unit represented by the formula (4):

$$\text{+CH}_2\text{—CR}^1\text{+} \quad (4)$$
$$\quad\quad | $$
$$\quad\quad \text{CN}$$

and/or a repeating unit represented by the formula (5):

$$\text{+CH}_2\text{—CR}^2\text{+} \quad (5)$$
$$\quad\quad | $$
$$\quad\quad ^+\text{NH}_3\text{X}^-$$

the total proportion of the repeating unit represented by the formula (1) and/or (2), the repeating unit represented by the formula (3), the repeating unit represented by the formula (4) and the repeating unit represented by the formula (5) being 97 to 100% by mole, wherein $R^1$ and $R^2$ independently denote a hydrogen atom or a methyl group, $R^3$ denotes an alkyl group having 1 to 4 carbon atoms or a hydrogen atom, and $X^-$ denotes an anion; and which has a reduced viscosity of 0.1 to 10 dl/g as measured in a 1N saline solution of 0.1 g/dl at 25° C.

38. The process for flocculating organic sludge of claim 37, the process further comprising dehydrating the flocculated organic sludge.

* * * * *